May 11, 1954   R. N. CLOSE   2,678,441
GROUND TRACK MARKER
Filed Jan. 29, 1946
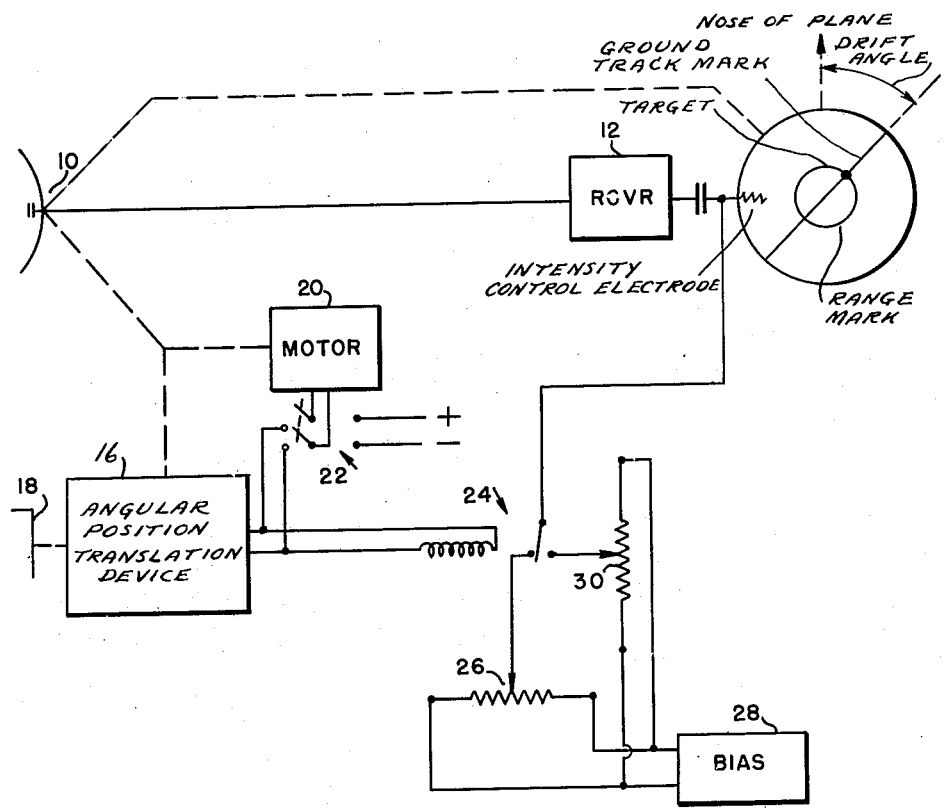
INVENTOR
RICHARD N. CLOSE
BY
William D. Hall
ATTORNEY Patented May 11, 1954

2,678,441

UNITED STATES PATENT OFFICE 2,678,441

GROUND TRACK MARKER

Richard N. Close, Philadelphia, Pa., assignor, by mesne assignments, to the United States of America as represented by the Secretary of War Application January 29, 1946, Serial No. 644,167

5 Claims. (Cl. 343—16)

This invention relates to an airborne radar or radio object locating system and more particularly to apparatus in conjunction with the radar system for presenting on the indicator thereof data concerning the ground track of the aircraft. The ground track of the aircraft is its path relative to the ground and is therefore an orthogonal projection on the ground of the aircraft's actual forward line of travel. Due to external forces such as wind, the ground track will in general be different from the apparent direction of travel as indicated by the aircraft's compass.

As disclosed in the copending application of Rubby Sherr entitled Communication System, Serial No. 624,907, filed October 26, 1945, the ground track of an aircraft may be determined by employing in the aircraft a radar or radio object locating system. In such a system echo pulses received at the aircraft from ground targets are inherently amplitude modulated and the frequency of the amplitude modulation is a minimum when the center line of the antenna of the radar system is coincident with the ground track of the aircraft. The amplitude modulation of the returned echoes may be visually observed on the usual cathode ray tube indicator. However no distinguishing mark continuously indicates the ground track of the aircraft.

In the copending application of Britton Chance and Ivan A. Greenwood, Jr. entitled Electromechanical Apparatus, Serial No. 644,166 filed January 29, 1946 apparatus is described for producing a ground track indication on the indicator of the radar while the antenna is continuously rotated to produce a plan position indication (P. P. I.) of objects lying within the range of the radar system.

It is an object of the present invention, therefore, to provide improved apparatus for generating a suitable voltage pulse for application to the indicator of a radar system at such times as to properly represent the ground track of the radar bearing aircraft.

It is a further object of the present invention to provide apparatus which may be easily added to existing apparatus to provide the desired ground track information.

Other objects of the present invention will become more apparent from the following detailed description which is to be read in connection with the accompanying drawing which illustrates in schematic wiring and block diagram form the preferred embodiment of the present invention.

In the accompanying drawing an antenna 10 of a radar system, portions of which are not shown, is connected to a receiver 12 the output of which is connected to a cathode ray tube indicator 14, both of which also form a part of the radar system. The cathode ray tube indicator 14 is preferably of the plan position indication (P. P. I.) type on which indications of all objects within the range of the radio object locating system are presented in polar coordinate form. The radar system is preferably adapted to indicate only objects which are moving relative to the aircraft and may be of a type similar to that disclosed in the above cited copending application of Rubby Sherr. An angular position translation device, such as the servo system shown on page 12, Radar System Fundamentals, Navship 900,017, published by the Bureau of Ships, Navy Department, in April 1944, 16 is provided with mechanical inputs from the antenna 10 and a handwheel 18. An electrical output from the device 16 is selectively connected to a driving motor 20 through a suitable switch 22 which is shown as being of the double-pole double-throw type. The motor 20 is mechanically connected to the antenna 10 and device 16. The servo loop 16 comprises such elements as are necessary to cause the motor 20 to position the antenna 10 in accordance with the setting of the handwheel 18 when the switch 22 is in such a position as to connect the motor 20 to the electrical output of the device 16. The remaining terminals of the switch 22 are connected to a suitable source of potential, denoted by + and − signs, which will cause the motor 20 to rotate the antenna 10 continuously in one direction when the switch 22 is properly set. The electrical output from the device 16 is also connected to the winding of a relay designated generally by 24. The relay 24 is adapted to provide a single-pole double-throw switch, the movable contact of which is connected to an intensifying electrode, preferably the intensity grid, of the cathode ray tube indicator 14. The contact of the relay 24 with which connection is made by the movable contact during the time of energization of relay 24 is connected to the slider of a potentiometer 26. The potentiometer 26 is connected across a suitable source of bias potential 28. The remaining contact of the single-pole double-throw switch that forms a part of the relay 24 is connected to the slider of a potentiometer 30 which is also connected across the source of bias potential 28.

In the operation of the apparatus illustrated in the accompanying drawing the radar system, portions of which are not shown, radiates short exploratory pulses of electromagnetic energy. These pulses of energy are partially reflected toward the antenna 10 by objects surrounding the system. The received energy is detected and amplified in the receiver 12 and applied to the indicator 14. To determine the ground track of the radar bearing aircraft the switch 22 is placed in a position such that the motor 20 is energized from the device 16. The handwheel 18 is rotated until the frequency of the amplitude modulation of signals appearing on the indicator is visually observed to reach a minimum. Without further disturbing the setting of the handwheel 18 the switch 22 is set in the opposite position so that the motor 20 is energized by a voltage of constant magnitude and polarity resulting in a continuous rotation in one direction of the antenna 10. The presentation on the indicator 14 will then be of the P. P. I. type. Due to the action of the device 16 a voltage will be applied across the winding of the relay 24 which will be substantially sinusoidal in nature but which will have a sufficiently long period to permit the relay to be energized on each half cycle thereof. The output voltage from the device 16 will pass through zero at substantially the time the antenna 10 passes through the position it occupied when the position of the handwheel was adjusted. The output from the device 16 will also pass through zero when the antenna is pointing 180 degrees from the direction specified above. When the output from the device 16 decreases to a value such that the relay 24 is no longer energized, the voltage applied to the intensifying element of the indicator 14 is changed from the value determined by the setting of the slider on the potentiometer 26 to a value determined by the setting of the slider on the potentiometer 30. The relative values of the voltages on the two sliders of the potentiometers 26 and 30, respectively, is such that an indentifying marker is present on the indicator 14 at such times as the relay 24 is deenergized. Two markers, displaced by 180 degrees, will appear on the indicator 14, since the sinusoidal output voltage from device 16 will have a change in polarity twice each cycle thereof, the relay being deenergized in time coincidence with each change of polarity. One of these markers may be removed if desired by utilization of a suitable cam and switch associated with the antenna 10. Since the phase of the sinusoidal voltage from device 16 is adjusted so that a node thereof coincides with the frequency of the amplitude modulation of the signals being a minimum, which is indicative of the ground track, it will be obvious that the indication which appears on the indicator 14 as a result of the action of the relay 24 will coincide with the desired ground track of the aircraft.

In the drawing, the indicator 14 has been represented as being the conventional P. P. I. type. The drawing represents the face of the cathode ray tube of the indicator on which the ground track mark appears as a line through the center of the tube face. This is due to the fact that the sweep of the cathode ray tube is centered with respect to the tube face. The intensifying electrode, indicated schematically in the drawing, has intensifying bias applied thereto at diametrically opposite positions during the P. P. I. scan as heretofore explained. Consequently, a pair of diametrically opposed radii in the form of bright lines appears on the face of the cathode ray tube representative of the ground track mark. The circular range mark and the bright spot indicative of the target, usual in such airborne object locating systems, are also indicated on the drawing.

While there has been described what is at present considered the preferred embodiment of the invention it will be obvious to those skilled in the art that various changes and modifications may be made therein without departing from the invention.

What is claimed is:

1. In an airborne object locating system, in combination with a radio object locating system including a rotatable antenna, a receiver coupled to said antenna and an indicator coupled to both said receiver and said antenna for presenting received echoes as a function of the angular position of said antenna; the apparatus comprising means for rotatively driving said antenna, an electromechanical device coupled to said antenna for producing a voltage output proportional to the sine of the angular position of said antenna relative to a reference direction and, when connected to energize said drive means, for rotating said antenna to said reference direction, a handwheel coupled to said device for adjusting the position of said reference direction, a power source adapted to energize said drive means and cause it continuously to rotate said antenna in one direction, switching means for selectively energizing said driving means with said output or said power source, and marker means coupled between said electromechanical device and said indicator for producing a marker on said indicator in response to the value of said voltage output when said antenna faces said reference direction.

2. The combination according to claim 1, wherein said antenna is rotatable in azimuth and said reference angle is adjusted to the azimuth of the actual course of said aircraft relative to ground.

3. The combination according to claim 1, wherein said indicator comprises a cathode-ray oscilloscope, and said marker means comprises a first bias voltage source having a magnitude sufficient to produce a visible marker on the face of said oscilloscope when connected to an intensity-control electrode thereof, a second bias voltage source having a magnitude insufficient to produce a visible marker on the face of said oscilloscope when connected to said intensity-control electrode, and a relay energized by said output for connecting said first source to said intensity-control electrode in response to said value of voltage output when said antenna faces said reference direction said value being substantially zero volts, and connecting said second source to said intensity-control electrode in response to said output having an absolute value greater than zero volts.

4. In an aircraft, in combination with a radio object locating system including a rotating antenna and means for presenting echoes received by said antenna as a function of the angular position of said antenna; the apparatus comprising electromechanical means synchronized with the rotation of said antenna for producing a sinusoidal voltage output having a frequency equal to the frequency of rotation of said antenna, means for phasing said output to have a node thereof in time coincidence with said antenna pointing in the direction of the actual course of said aircraft relative to the ground, and marker means coupled to said electromechanical means and coupled to and producing a marker on said means for presenting echoes in response to the nodes of said output.

5. In combination with an airborne radar system including a rotatable antenna, a receiver to said antenna, and an indicator coupled to said receiver and to said antenna for displaying received echoes as a function of the angular position of said antenna; an apparatus comprising means for rotatively driving said antenna; an electromechanical device coupled to said antenna for producing a voltage output proportional to the sine of the angular position of said antenna relative to a reference direction, the point of maximum slope of said voltage output corresponding to said reference direction, and, when connected to energize said drive means, for rotating said antenna to said reference direction; means coupled to said device for adjusting the position of said reference direction; means coupled to said receiver for detecting and determining the magnitude of the amplitude modulation of said received echoes; whereby when said amplitude modulation is at a minimum, said antenna points toward the ground track of said aircraft; a power source adapted to energize said driving means and cause it to rotate said antenna in one direction; switching means coupled to said driving means for selectively energizing said driving means with said voltage output or said power source, and marker means coupled between said electromechanical device and said indicator for producing a marker on said indicator in response to said point of maximum slope of said voltage output.

References Cited in the file of this patent

UNITED STATES PATENTS

| Number | Name | Date |
|---|---|---|
| 1,820,647 | Brown | Aug. 25, 1931 |
| 2,223,224 | Newhouse | Nov. 26, 1940 |
| 2,372,620 | Williams | Mar. 27, 1945 |
| 2,399,426 | Bradley | Apr. 30, 1946 |
| 2,401,432 | Luck | June 4, 1946 |
| 2,406,858 | Shepherd | Sept. 3, 1946 |
| 2,412,670 | Epstein | Dec. 17, 1946 |
| 2,416,562 | Alexanderson | Feb. 25, 1947 |
| 2,422,697 | Meacham | June 24, 1947 |
| 2,447,728 | Bartholy | Aug. 24, 1948 |
| 2,476,032 | Feldman et al. | July 12, 1949 |